United States Patent
Daicho et al.

(10) Patent No.: US 11,085,406 B2
(45) Date of Patent: Aug. 10, 2021

(54) COOLING CONTROL SYSTEM FOR INTERNAL COMBUSTION ENGINE

(71) Applicant: HONDA MOTOR CO., LTD., Tokyo (JP)

(72) Inventors: Hisashi Daicho, Wako (JP); Jyo Ishimasa, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/647,968

(22) PCT Filed: Oct. 16, 2018

(86) PCT No.: PCT/JP2018/038530
§ 371 (c)(1),
(2) Date: Mar. 17, 2020

(87) PCT Pub. No.: WO2019/078213
PCT Pub. Date: Apr. 25, 2019

(65) Prior Publication Data
US 2020/0217282 A1    Jul. 9, 2020

(30) Foreign Application Priority Data

Oct. 17, 2017   (JP) ............................ JP2017-200821

(51) Int. Cl.
| | |
|---|---|
| *F01P 3/20* | (2006.01) |
| *F01P 7/16* | (2006.01) |
| *F02M 35/10* | (2006.01) |
| *F01P 5/12* | (2006.01) |
| *F02B 63/04* | (2006.01) |
| *F02D 41/12* | (2006.01) |

(52) U.S. Cl.
CPC ......... *F02M 35/10268* (2013.01); *F01P 5/12* (2013.01); *F02B 63/04* (2013.01);
(Continued)

(58) Field of Classification Search
CPC .......... F01P 2060/02; F01P 3/20; F01P 7/164; F01P 3/12
See application file for complete search history.

(56) References Cited

U.S. PATENT DOCUMENTS

| | | | |
|---|---|---|---|
| 2015/0369179 A1* | 12/2015 | Hotta ........................ | F01P 3/08 123/568.12 |
| 2016/0121694 A1* | 5/2016 | Kim ......................... | B60H 1/08 62/160 |

(Continued)

FOREIGN PATENT DOCUMENTS

| | | |
|---|---|---|
| JP | 2012-29464 A | 2/2012 |
| JP | 2016-94904 A | 5/2016 |

(Continued)

OTHER PUBLICATIONS

International Search Report dated Nov. 20, 2018, issued in counterpart International Application No. PCT/JP2018/038530, with English Translation. (3 pages).

*Primary Examiner* — Long T Tran
(74) *Attorney, Agent, or Firm* — Westerman, Hattori, Daniels & Adrian, LLP (57) ABSTRACT

A cooling control system for an internal combustion engine, which is capable of efficiently driving an electric water pump, thereby improving fuel economy as much as possible while properly performing cooling of supercharged intake air by an intercooler. The engine to which the present invention is applied includes a turbocharger for supercharging intake air and is configured such that electrical power is generated by a generator using the engine as a motive power source, during a decelerating fuel-cut operation in which fuel supply is stopped. The cooling control system of the present invention includes the intercooler of water-cooled type which cools the intake air supercharged by the turbocharger by using coolant circulating through an intake air (Continued)

cooling circuit and an electric pump for circulating the coolant through the intake air cooling circuit, and drives the electric pump during the decelerating fuel-cut operation.

5 Claims, 4 Drawing Sheets

(52) U.S. Cl.
CPC ....... *F02D 41/123* (2013.01); *F02M 35/1038* (2013.01); *F02M 35/10157* (2013.01); *F01P 2060/02* (2013.01)

(56) References Cited

U.S. PATENT DOCUMENTS

| | | | | |
|---|---|---|---|---|
| 2016/0123214 A1* | 5/2016 | Kim | ........................ | F01P 7/164 |
| | | | | 60/605.1 |
| 2016/0131016 A1* | 5/2016 | Mehravaran | ........ | F02B 29/0493 |
| | | | | 123/41.1 |
| 2016/0138460 A1* | 5/2016 | Kim | ........................ | F01P 7/16 |
| | | | | 123/41.1 |
| 2016/0326943 A1* | 11/2016 | Kimura | ............... | F02B 29/0443 |
| 2017/0074157 A1* | 3/2017 | Mitkari | ................ | F02B 37/005 |
| 2017/0152790 A1* | 6/2017 | Morishima | ...... | F02M 35/10268 |
| 2017/0292463 A1* | 10/2017 | Ochi | ........................ | F02D 37/02 |
| 2017/0306898 A1* | 10/2017 | Kim | .................... | F02D 41/0065 |
| 2018/0058354 A1* | 3/2018 | Linker | ........................ | F01P 7/14 |
| 2018/0334951 A1* | 11/2018 | Uto | ........................ | F02M 26/33 |
| 2019/0162110 A1* | 5/2019 | Manju | ........................ | F01P 3/12 |

FOREIGN PATENT DOCUMENTS

| | | |
|---|---|---|
| JP | 2016-211430 A | 12/2016 |
| WO | 2017/119445 A1 | 7/2017 |

\* cited by examiner

COOLING CONTROL SYSTEM FOR INTERNAL COMBUSTION ENGINE

TECHNICAL FIELD

The present invention relates to a cooling control system for an internal combustion engine, which cools intake air supercharged by a supercharger using a water-cooled intercooler and controls the cooling of the intake air using an electric water pump that sends coolant to the intercooler.

BACKGROUND ART

As the conventional cooling control system of the above-described kind, there has been known one disclosed e.g. in PTL 1. This cooling control system includes a water-cooled intercooler for cooling supercharged intake air by coolant circulating through a cooling circuit, and an electric water pump for circulating the coolant through the cooling circuit (hereinafter referred to as the "electric pump"). An intake air temperature sensor is provided at an outlet of the intercooler, and a drive signal to the electric pump is duty-controlled such that an intake air temperature detected by the intake air temperature sensor becomes equal to a predetermined target temperature.

CITATION LIST

Patent Literature

[PTL 1] Japanese Laid-Open Patent Publication (Kokai) No. 2016-94904

SUMMARY OF INVENTION

Technical Problem

Compared with an air-cooled intercooler, the water-cooled intercooler described as above is advantageous in that it has excellent layout flexibility for compact vehicles and can be manufactured at low costs because its piping system is compact, for example. On the other hand, differently from the air-cooled intercooler, the water-cooled intercooler uses the electric pump for circulating coolant, and hence unless the electric pump is efficiently driven, power consumption is increased, which can adversely affect fuel economy.

On the other hand, in the conventional cooling control system, the electric pump is only controlled such that the intake air temperature detected at the outlet of the intercooler becomes equal to the target temperature, irrespective of an operating state of the engine. For this reason, although the target intake air temperature is achieved, the electric pump can be more driven than required, depending on the operating state of the engine e.g. in a situation in which the necessity to cool intake air is low. In this case, electrical power is wastefully consumed, which in turn leads to degradation of fuel economy of the engine.

The present invention has been made to provide a solution to the above-described problems, and an object thereof is to provide a cooling control system for an internal combustion engine, which is capable of efficiently driving an electric water pump, thereby improving fuel economy as much as possible while properly performing cooling of supercharged intake air by the intercooler.

Solution to Problem

To attain the above object, the invention according to claim 1 is a cooling control system for an internal combustion engine that includes a supercharger (turbocharger 11 in the embodiment (hereinafter, the same applies throughout this section)) for supercharging intake air, and is configured such that electrical power is generated by a generator 10 using the engine 3 as a motive power source, during a decelerating fuel-cut operation in which fuel supply to the engine is stopped, the cooling control system comprising a water-cooled intercooler 7 that cools the intake air supercharged by the supercharger, by using coolant circulating through a cooling circuit (intake air cooling circuit 40), an electric water pump (electric pump 43) for circulating the coolant through the cooling circuit, and pump control means (ECU 2, steps 1 and 7 in FIG. 3) for driving the water pump during the decelerating fuel-cut operation.

The engine to which the present invention is applied includes the supercharger for supercharging intake air. During the decelerating fuel-cut operation in which fuel supply is stopped, the power generation by the generator is executed using the engine as a motive power source. Further, the cooling control system for the engine includes the water-cooled intercooler that cools the supercharged intake air by using the coolant circulating through the cooling circuit and the electric water pump for circulating the coolant through the cooling circuit. According to this cooling control system, the water pump is driven during the decelerating fuel-cut operation, whereby the cooling of the supercharged intake air by the intercooler is performed in a state in which the coolant is circulating through the cooling circuit.

With this arrangement, the decelerating fuel-cut operating state is a state in which, during deceleration, electrical power is generated by the motive power (kinetic energy) of the engine that rotates by inertia, without using fuel. Therefore, by driving the water pump during the decelerating fuel-cut operation, electrical power generated without fuel consumption is made use of and the temperature of the supercharged intake air is lowered as much as possible, whereby it is possible to reduce the frequency and time period of driving the water pump in operating states other than the decelerating fuel-cut operating state. With this, the water pump is efficiently driven, whereby it is possible to improve fuel economy as much as possible while properly performing cooling of the supercharged intake air by the intercooler.

Figure 3:
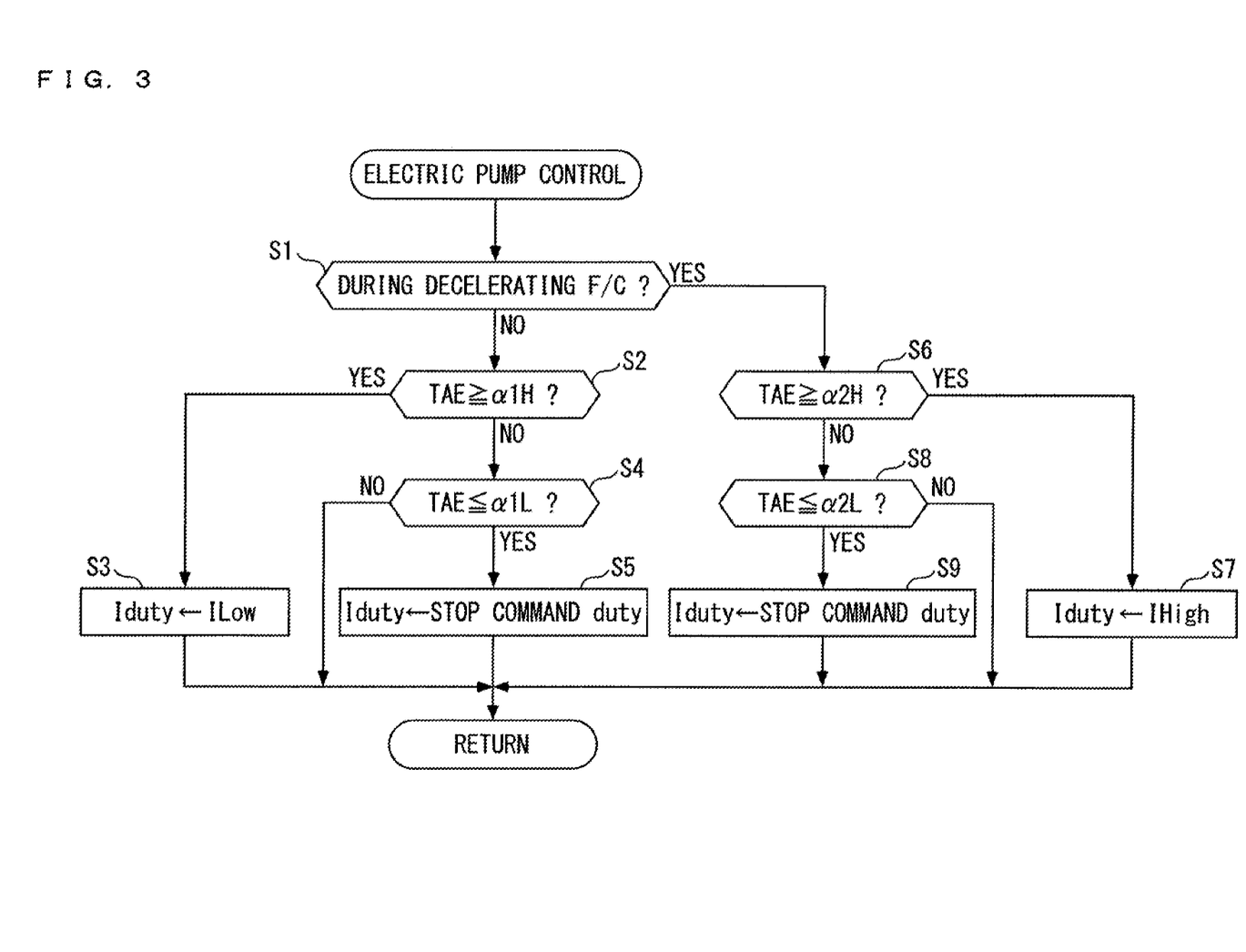
FIG. 3 A flowchart of a control process of an electric pump.
Figure 4:
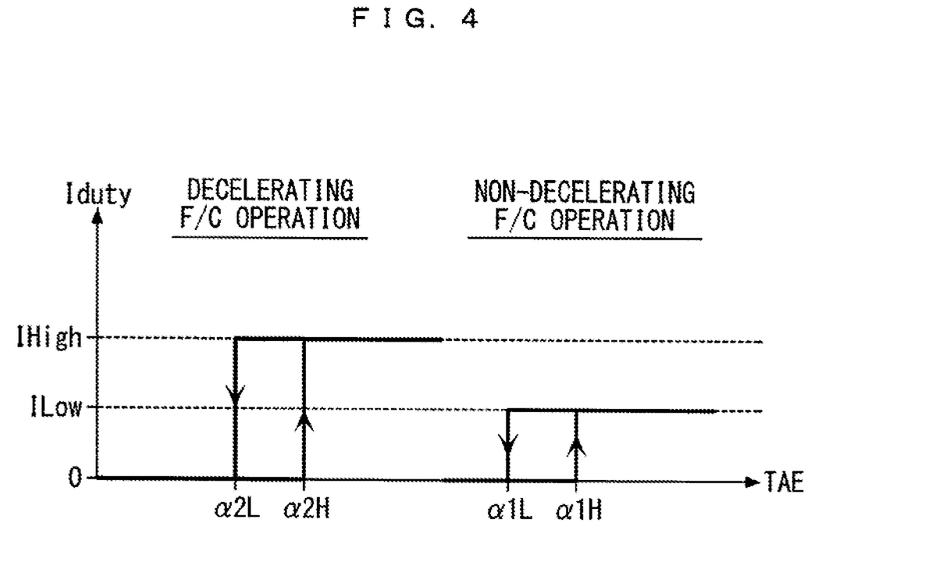
FIG. 4 A diagram showing a relationship between an intake air temperature and an energization duty ratio of the electric pump during a decelerating fuel-cut operation and a non-decelerating fuel-cut operation.

The invention according to claim 2 is the cooling control system according to claim 1, further comprising intake air temperature detection means (intake air temperature sensor 51) for detecting an intake air temperature (intake air temperature TAE) at an outlet of the intercooler, wherein during non-decelerating fuel-cut operation which is an operating state other than the decelerating fuel-cut operation, the pump control means drives the water pump when the detected intake air temperature is equal to or higher than a predetermined first threshold value (high-temperature-side first threshold value α1H), whereas during the decelerating fuel-cut operation, the pump control means drives the water pump when the intake air temperature is equal to or higher than a predetermined second threshold value (high-temperature-side second threshold value α2H) smaller than the first threshold value (steps 1 to 3, 6, and 7 in FIG. 3; FIG. 4).

With this configuration, during the decelerating fuel-cut operation, the water pump is driven when the detected intake air temperature at the outlet of the intercooler is equal to or higher than the smaller second threshold value. This expands an intake air temperature region for driving the water pump to thereby increase the frequency of executing driving the water pump, whereby it is possible to further lower the intake air temperature. Further, during the decelerating fuel-cut operation, when the intake air temperature is lower than the second threshold value, the water pump is not driven, and hence even during the decelerating fuel-cut operation, it is possible to effectively avoid a useless operation of the water pump which hardly contributes to cooling of intake air since the temperature of the intake air is low.

On the other hand, during the non-decelerating fuel-cut operation, the water pump is driven when the intake air temperature is equal to or higher than the first threshold value larger than the second threshold value. This reduces the intake air temperature region for driving the water pump to thereby limit execution of driving the water pump, and hence it is possible to further reduce power consumption during the non-decelerating fuel-cut operation.

The invention according to claim 3 is the cooling control system according to claim 1 or 2, wherein during non-decelerating fuel-cut operation which is an operating state other than the decelerating fuel-cut operation, the pump control means drives the water pump by predetermined first electrical power (first duty ratio ILow), whereas during the decelerating fuel-cut operation, the pump control means drives the water pump by predetermined second electrical power (second duty ratio IHigh) larger than the first electrical power (steps 1, 3, and 7 in FIG. 3).

With this configuration, during the decelerating fuel-cut operation, the water pump is driven by the larger second electrical power. With this, during a limited time period for the decelerating fuel-cut operation, the intake air temperature is lowered as much as possible, whereby it is possible to further reduce the frequency and time period of driving the water pump during the non-decelerating fuel-cut operation. Further, during this non-decelerating fuel-cut operation, the water pump is driven by the smaller first electrical power, so that it is possible to further reduce power consumption.

DESCRIPTION OF EMBODIMENTS

Figure 1:
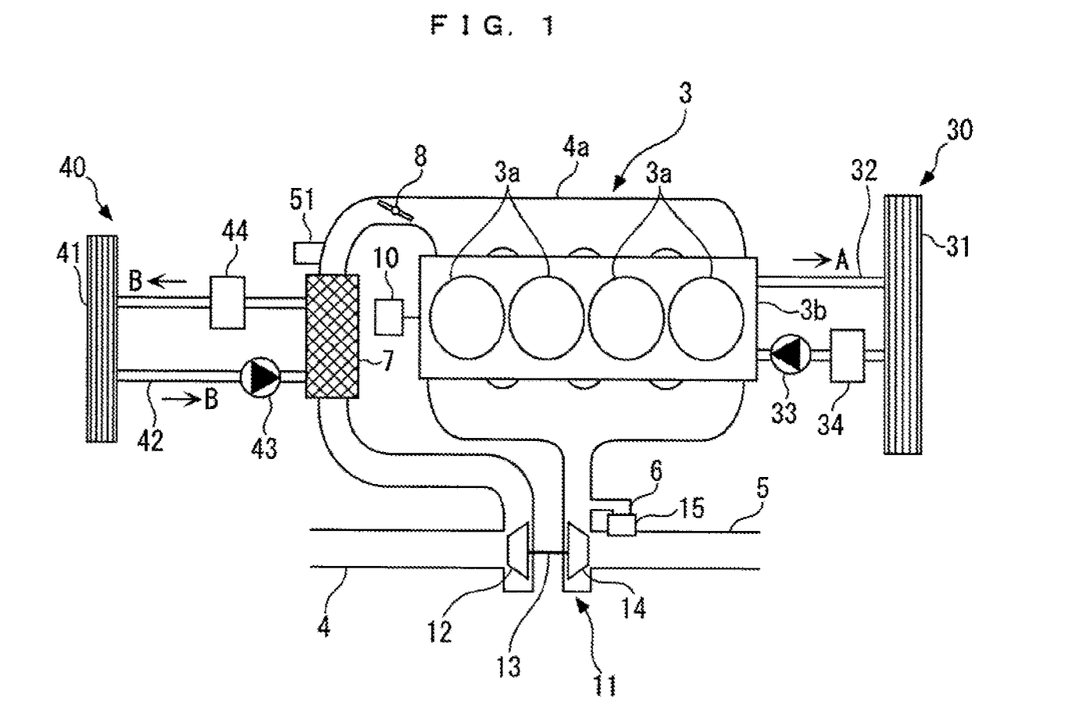
FIG. 1 A schematic diagram of an internal combustion engine to which is applied the present invention.

The invention will now be described in detail with reference to drawings showing preferred embodiments thereof. An internal combustion engine (hereinafter referred as "the "engine") 3 shown in FIG. 1 is a gasoline engine that has e.g. four cylinders 3a and is installed on a vehicle (not shown), as a motive power source.

The engine 3 has a generator 10 connected thereto. The generator 10 generates electrical power by regenerating motive power (operational energy) of the engine 3. The operation of the generator 10 is controlled by an ECU (Electronic Control Unit) 2 (see FIG. 2). Generation of electrical power by the generator 10 is executed during a decelerating fuel-cut operation in which fuel supply to the engine 3 is stopped, or alternatively, executed as deemed appropriate when predetermined conditions are satisfied, including e.g. a condition that a battery charge ratio is reduced to a predetermined value or lower, in an operating state other than during the decelerating fuel-cut operation. The generated electrical power is charged to a battery (not shown).

Further, the engine 3 includes a turbocharger 11 and a cooling device 21. The turbocharger 11 is comprised of a compressor 12 disposed in an intake passage 4, and a turbine 14 disposed in an exhaust passage 5 and integrally connected to the compressor 12 via a shaft 13. The turbine 14 is driven for rotation by exhaust gases flowing though the exhaust passage 5, and intake air is pressurized (supercharged) by the compressor 12 rotated in unison with the turbine 14.

Further, a bypass passage 6 bypassing the turbine 14 is connected to the exhaust passage 5. The bypass passage 6 is provided with a wastegate valve (hereinafter referred to as the "WG valve") 15. The degree of opening of this WG valve 15 is controlled by a drive signal from the ECU 2 (see FIG. 2), whereby a boost pressure is adjusted.

An intercooler 7 and a throttle valve 8 are provided in the intake passage 4 at respective locations downstream of the compressor 12 in the mentioned order.

The intercooler 7, which is a water-cooled type, cools intake air supercharged by the compressor 12 of the turbocharger 11 and increased in temperature, by heat exchange with coolant flowing therethrough.

The throttle valve 8 is disposed in the intake passage 4 at a location upstream of an intake manifold 4a. The degree of opening of the throttle valve 8 is controlled via a TH actuator 8a by a drive signal from the ECU 2 (see FIG. 2), whereby the amount of intake air drawn into the cylinder 3a is controlled.

The cooling device 21 includes an engine cooling circuit 30 for cooling the engine 3 and an intake air cooling circuit 40 for cooling the supercharged intake air by the intercooler 7. The cooling circuits 30 and 40 are independent of each other.

The engine cooling circuit 30 is comprised of an engine body 3b, a main radiator 31, a circular coolant passage 32 which is connected to the engine body 3b and the main radiator 31 and is filled with coolant, a mechanical water pump (hereinafter referred to as the "mechanical pump") 33 driven by the engine 3, and a buffer expansion tank 34 provided between the main radiator 31 and the mechanical pump 33.

In the engine cooling circuit 30, during operation of the engine 3, coolant is delivered by the mechanical pump 33 and is circulated through the coolant passage 32 in a clockwise direction as viewed in FIG. 1 (in a direction indicated by an arrow A). Along with this circulation, the coolant cools the engine 3 as it passes through the engine body 3b and dissipates heat as it passes through the main radiator 31. Since the engine body 3b is in a high-temperature state due to combustion and heat generation of the engine 3, the temperature of the coolant in the engine cooling circuit 30 becomes relatively high.

On the other hand, the intake air cooling circuit 40 is comprised of the intercooler 7, a sub radiator 41, an circular coolant passage 42 which is connected to the intercooler 7 and the sub radiator 41 and is filled with coolant, an electric water pump (hereinafter referred to as the "electric pump") 43, and a buffer expansion tank 44 provided between the intercooler 7 and the sub radiator 41.

In the intake air cooling circuit 40, coolant is delivered by the electric pump 43 and is circulated through the coolant passage 42 in a counterclockwise direction as viewed in FIG. 1 (in a direction indicated by an arrow B). Along with this circulation, the coolant cools, as it passes through the intercooler 7, intake air flowing therethrough, and dissipates heat as it passes through the sub radiator 41. Normally, the temperature of supercharged intake air is lower than the temperature of the engine body 3b, and hence the temperature of the coolant in the intake air cooling circuit 40 becomes lower than the temperature of the coolant in the engine cooling circuit 30.

The above-mentioned electric pump 43 is controlled according to the duty ratio (hereinafter referred to as the "energization duty ratio") Iduty of the drive signal energized by the ECU 2 (see FIG. 2). Specifically, when the energization duty ratio Iduty is a stop command duty, the electric pump 43 is stopped. As the energization duty ratio Iduty is higher, the amount of coolant delivered by the electric pump 43 is increased, and the cooling ability of the intercooler 7 becomes higher.

Further, an intake air temperature sensor 51 is provided in the intake passage 4 at a location immediately downstream of the intercooler 7. The intake air temperature sensor 51 detects the temperature of intake air at an outlet of the intercooler 7 (hereinafter referred to as the "intake air temperature") TAE and delivers a detection signal indicative of the detected intake air temperature TAE to the ECU 2.

Figure 2:
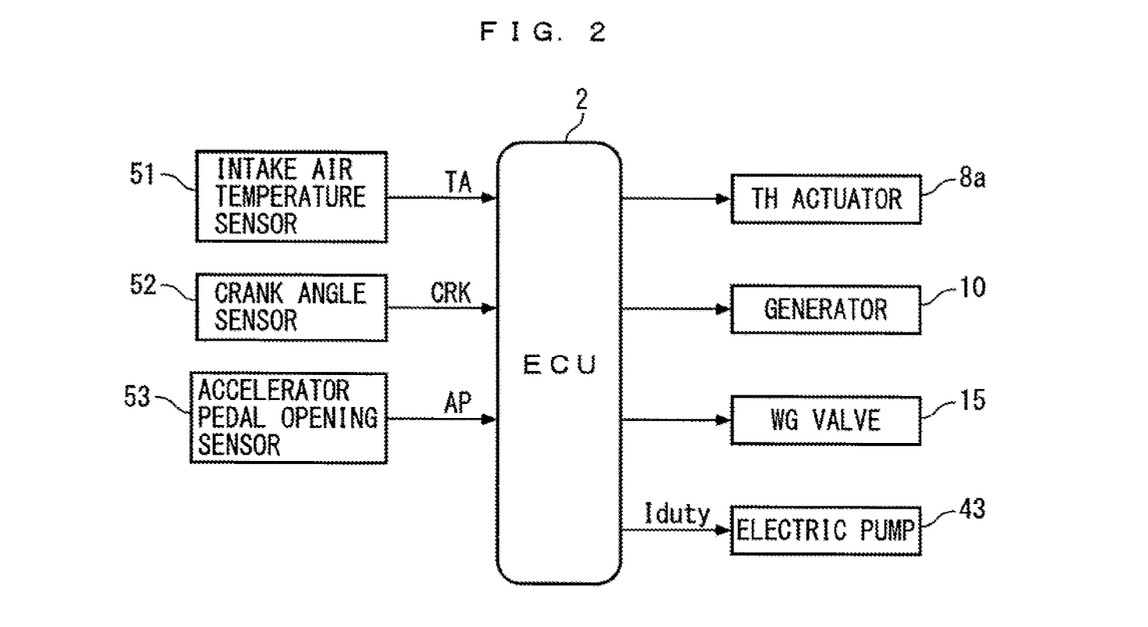
FIG. 2 A schematic block diagram of a cooling control system.

Further, the engine 3 is provided with a crank angle sensor 52 (see FIG. 2). The crank angle sensor 52 delivers a CRK signal, which is a pulse signal, to the ECU 2 along with rotation of a crankshaft (not shown), whenever the crankshaft rotates through a predetermined crank angle (e.g. 30°). The ECU 2 calculates a rotational speed of the engine 3 (hereinafter referred to as the "engine speed") NE based on the CRK signal. Further, a detection signal indicative of a stepped-on amount (hereinafter referred to as "accelerator pedal opening") AP of an accelerator pedal (not shown) of the vehicle is input from an accelerator pedal opening sensor 53 to the ECU 2.

The ECU 2 is implemented by a microcomputer comprised of a CPU, a RAM, a ROM, and an I/O interface (none of which are shown). The ECU 2 performs various control processes according to the detection signals from the aforementioned sensors 51 to 53, and so forth. Particularly in the present embodiment, a control process of the electric pump 43 is executed as cooling control of the engine 3. In the present embodiment, the ECU 2 forms pump control means.

FIG. 3 shows the control process of the electric pump 43. The present process is repeatedly executed at a predetermined repetition period. In the present process, first, in a step 1 (shown as S1 in abbreviated form in FIG. 3; the following steps are also shown in abbreviated form), it is determined whether or not the engine 3 is during the decelerating fuel-cut (F/C) operation.

Note that the decelerating fuel-cut operation is executed when predetermined decelerating fuel-cut conditions are satisfied, including e.g. conditions that the engine speed NE is equal to or larger than a predetermined fuel-cut engine speed and also that the accelerator pedal opening AP is approximately equal to 0. Further, as described above, during the decelerating fuel-cut operation, electrical power is generated by the generator 10.

If the answer to the question of the step 1 is negative (NO), i.e. if the engine 3 is not during the decelerating fuel-cut operation, e.g. if a traveling operation other than the decelerating fuel-cut operation, an idling operation or the like (hereinafter referred to as the "non-decelerating fuel-cut operation") is being performed, it is determined whether or not the intake air temperature TAE detected by the intake air temperature sensor 51 is equal to or higher than a high-temperature-side first threshold value $\alpha 1H$ (step 2). If the answer to this question is affirmative (YES), i.e. if $TAE \geq \alpha 1H$ holds, the energization duty ratio Iduty of the electric pump 43 is set to a relatively small first duty ratio ILow (step 3), whereby the electric pump 43 is driven by low power, followed by terminating the present process.

If the answer to the question of the step 2 is negative (NO), it is determined whether or not the intake air temperature TAE is equal to or lower than a low-temperature-side first threshold value $\alpha 1L$ which is smaller than the high-temperature-side first threshold value $\alpha 1H$ (see FIG. 4) (step 4). These high-temperature-side and low-temperature-side first threshold values $\alpha 1H$ and $\alpha 1L$ are paired with each other, and are for setting hysteresis. If the answer to the question of the step 3 is affirmative (YES), i.e. if $TAE \leq \alpha 1L$ holds, the energization duty ratio Iduty is set to the stop command duty (step 5), whereby the electric pump 43 is stopped, followed by terminating the present process.

If the answer to the question of the step 4 is negative (NO), i.e. if the intake air temperature TAE is between the high-temperature-side and low-temperature-side first threshold values 60 1 H and $\alpha 1L$ ($\alpha 1L < TAE < \alpha 1H$), the present process is immediately terminated. That is, in this case, a controlled state of the electric pump 43 in the immediately preceding processing cycle (a low-power driven state or a stopped state) is maintained, whereby control hunting of the electric pump 43 is positively avoided.

On the other hand, if the answer to the question of the step 1 is affirmative (YES), i.e. if the engine 3 is during the decelerating fuel-cut operation, it is determined whether or not the intake air temperature TAE is equal to or higher than a high-temperature-side second threshold value $\alpha 2H$ (step 6). As shown in FIG. 4, this high-temperature-side second threshold value $\alpha 2H$ is smaller than the above-mentioned low-temperature-side first threshold value $\alpha 1L$ for the non-decelerating fuel-cut operation. If the answer to the question of the step 6 is affirmative (YES), i.e. if $TAE \geq \alpha 2H$ holds, the energization duty ratio Iduty of the electric pump 43 is set to a second duty ratio IHigh which is larger than the first duty ratio ILow mentioned above (step 7), whereby the electric pump 43 is driven by high power, followed by terminating the present process.

If the answer to the question of the step 6 is negative (NO), it is determined whether or not the intake air temperature TAE is equal to or lower than a low-temperature-side second threshold value $\alpha 2L$ which is smaller than the high-temperature-side second threshold value $\alpha 2H$ (see FIG. 4) (step 8). These high-temperature-side and low-temperature-side second threshold values $\alpha 2H$ and $\alpha 2L$ are paired with each other, and are for setting hysteresis. If the answer to the question of the step 8 is affirmative (YES), i.e. if $TAE \leq \alpha 2L$ holds, the energization duty ratio Iduty is set to the stop command duty (step 9), whereby the electric pump 43 is stopped, followed by terminating the present process.

If the answer to the question of the step 8 is negative (NO), i.e. if the intake air temperature TAE is between the high-temperature-side and low-temperature-side second threshold values $\alpha 2H$ and $\alpha 2L$ ($\alpha 2L < TAE < \alpha 2H$), the present process is immediately terminated. That is, in this case, a controlled state of the electric pump 43 in the immediately preceding processing cycle (a high-power driven state or a stopped state) is maintained, whereby the control hunting of the electric pump 43 is positively avoided.

Figure 5:
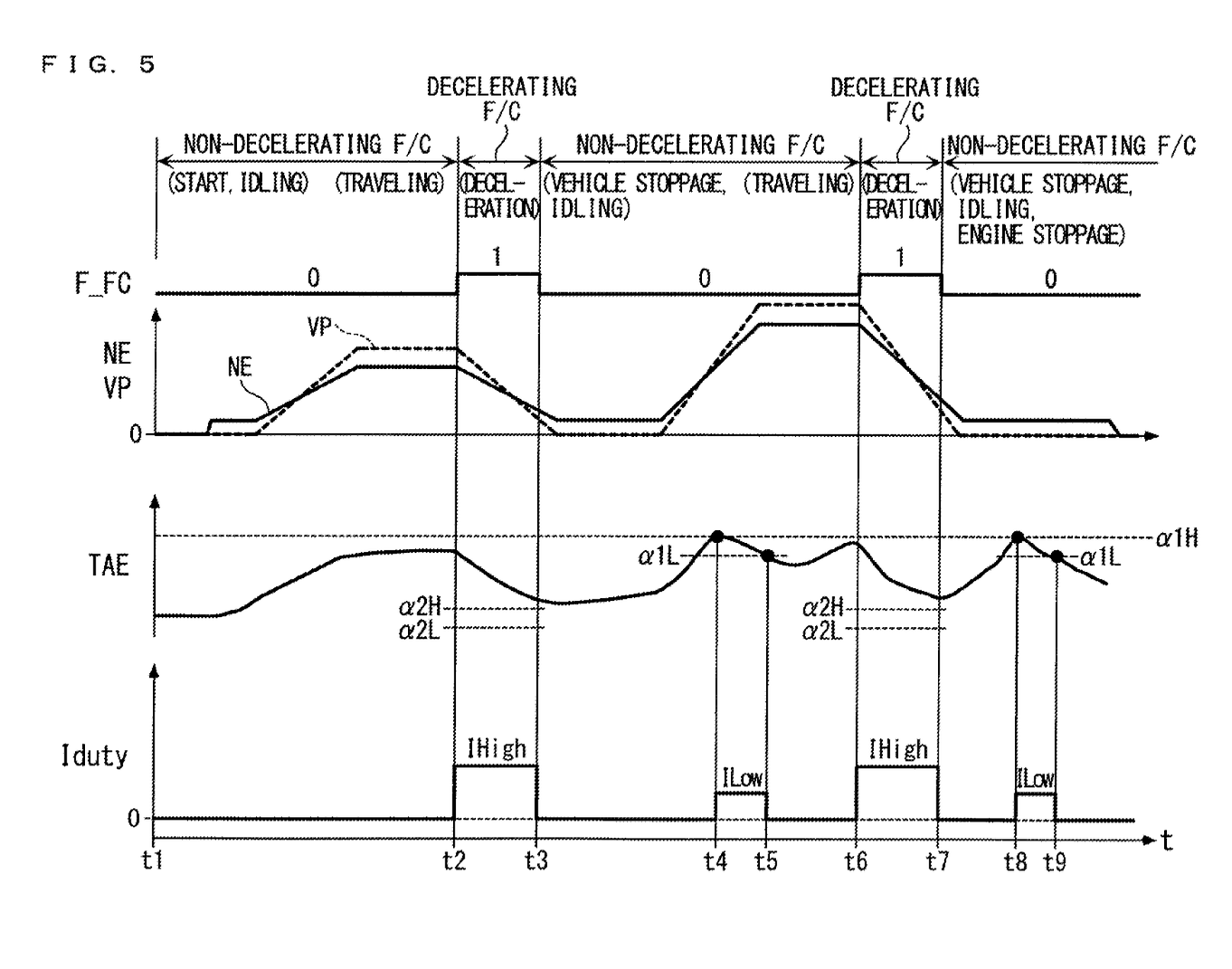
FIG. 5 A timing diagram showing an example of operation realized by the process in FIG. 3.

Next, an example of operation realized by the control process of the electric pump 43, described above with reference to FIG. 4, will be described with reference to FIG.

5. In this example, during a time period between time points t2 and t3 and a time period between time points t6 and t7, the predetermined decelerating fuel-cut conditions are satisfied, so that a fuel-cut flag F_FC is set to 1, whereby the decelerating fuel-cut operation is executed. The other time periods each are a non-decelerating fuel-cut operation period.

Specifically, in the non-decelerating fuel-cut operation period from a time point t1 to the time point t2, the engine 3 is started at the time point t1, and after an idling operation, the engine speed NE and a vehicle speed VP are increased in accordance with a standing start operation, whereafter the vehicle shifts to a steady traveling state in which the NE value and the VP value are approximately constant. During this time, the intake air temperature TAE rises but has not yet reached the high-temperature-side first threshold value α1H even in the steady traveling state (NO to the step 2 in FIG. 3), so that the energization duty ratio Iduty is set to the stop command duty (step 5), whereby the electric pump 43 is held in the stopped state.

When the decelerating fuel-cut operation is started at the time point t2, in the present example, the intake air temperature TAE is higher than the high-temperature-side second threshold value α2H over the entire time period from the time point t2 to the time point t3 (YES to the step 6), so that the energization duty ratio Iduty is set to the second duty ratio IHigh (step 7), whereby the electric pump 43 is driven by high power. With this, supercharged intake air is cooled in a state in which the amount of coolant delivered by the electric pump 43 is large and the cooling ability of the intercooler 7 is high, whereby the intake air temperature TAE is lowered.

After the vehicle has shifted to the non-decelerating fuel-cut operation at the time point t3, in a stopped state of the vehicle or in a state in which idling operation is being performed, the intake air temperature TAE is lower than the high-temperature-side first threshold value α1H (NO to the step 2), so that the energization duty ratio Iduty is set to the stop command duty (step 5), whereby the electric pump 43 is held in the stopped state. After that, as the vehicle shifts to a traveling state, the intake air temperature TAE rises, and when the intake air temperature TAE reaches the high-temperature-side first threshold value α1H at a time point t4 (YES to the step 2), the energization duty ratio Iduty is set to the first duty ratio ILow (step 3), whereby the electric pump 43 is driven by low power. With this, the supercharged intake air is cooled in a state in which the amount of coolant delivered by the electric pump 43 is small and the cooling ability of the intercooler 7 is low, whereby the intake air temperature TAE is lowered.

This low-power driven state of the electric pump 43 is maintained until the intake air temperature TAE becomes equal to or lower than the low-temperature-side first threshold value α1L (NO to the step 4). When the intake air temperature TAE becomes equal to or lower than the low-temperature-side first threshold value α1L at a time point t5 (YES to the step 4), the energization duty ratio Iduty is set to the stop command duty (step 5), whereby the electric pump 43 is controlled to the stopped state. After that, unless the intake air temperature TAE reaches the high-temperature-side first threshold value α1H, the electric pump 43 is held in the stopped state.

When the decelerating fuel-cut operation is started again at the time point t6, the intake air temperature TAE is higher than the high-temperature-side second threshold value α2H over the entire time period from the time point t6 to the time point t7, and hence similar to the case of the time period from the time point t2 to the time point t3, the energization duty ratio Iduty is set to the second duty ratio IHigh (step 7), whereby the electric pump 43 is driven by high power.

Then, after the vehicle shifts to the non-decelerating fuel-cut operation at the time point t7, the vehicle is stopped and the engine 3 shifts to idling operation and then is stopped. In this case, the control of the electric pump 43 is basically the same as in the above-described case of the time period from the time point t3 to the time point t6. More specifically, at the beginning of this time period, the intake air temperature TAE is lower than the high-temperature-side first threshold value α1H, so that the electric pump 43 is controlled to the stopped state (step 5). Then, when the intake air temperature TAE has risen to the high-temperature-side first threshold value α1H during the idling operation (time point t8), the energization duty ratio Iduty is set to the first duty ratio ILow, whereby the electric pump 43 is switched to the low-power driven state (step 3). This low-power driven state is maintained until the intake air temperature TAE becomes equal to or lower than the low-temperature-side first threshold value α1L (time point t9), and then the electric pump 43 is controlled to the stopped state.

Note that although in the above-described example, a situation in which during the decelerating fuel-cut operation, the intake air temperature TAE becomes equal to or lower than the low-temperature-side second threshold value α2L is not described, in such a case (YES to the step 8), the energization duty ratio Iduty is set to the stop command duty (step 9), whereby the electric pump 43 is controlled to the stopped state.

As described heretofore, according to the present embodiment, by driving the electric pump 43 during the decelerating fuel-cut operation, it is possible to make use of electrical power generated by the generator 10 without fuel consumption to reduce the temperature of the supercharged intake air as much as possible, whereby it is possible to reduce the frequency and time period of driving the electric pump 43 during the non-decelerating fuel-cut operation. With this, the electric pump 43 is efficiently driven, whereby it is made possible to improve fuel economy as much as possible while properly performing cooling of the supercharged intake air by the intercooler 7.

Further, during the decelerating fuel-cut operation, the electric pump 43 is driven when the intake air temperature TAE detected at the outlet of the intercooler 7 is equal to or higher than the smaller high-temperature-side second threshold value α2H. This expands an intake air temperature region for driving the electric pump 43 to thereby increase the frequency of executing driving the electric pump 43, whereby it is possible to further lower the temperature of intake air. Further, during the decelerating fuel-cut operation, when the intake air temperature TAE is lower than the low-temperature-side second threshold value α2L, the electric pump 43 is not driven, and therefore even during the decelerating fuel-cut operation, it is possible to effectively avoid a useless operation of the electric pump 43 which hardly contributes to cooling of the intake air since the temperature of the intake air is low.

On the other hand, during the non-decelerating fuel-cut operation, when the intake air temperature TAX is equal to or higher than the high-temperature-side first threshold value α1H larger than the high-temperature-side second threshold value α2H, the electric pump 43 is driven. This reduces the intake air temperature region for driving the electric pump 43 to thereby limit execution of driving the electric pump 43, and hence it is possible to further reduce power consumption during the non-decelerating fuel-cut operation.

Further, during the decelerating fuel-cut operation, the electric pump 43 is driven at the larger second duty ratio IHigh. With this, during a limited time period for the decelerating fuel-cut operation, the temperature of the intake air is lowered as much as possible, whereby it is possible to further reduce the frequency and time period of driving the electric pump 43 during the non-decelerating fuel-cut operation. Further, during this non-decelerating fuel-cut operation, the electric pump 43 is driven at the first duty ratio ILow smaller than the second duty ratio IHigh, so that it is possible to further reduce power consumption.

Further, the threshold value for the decelerating fuel-cut operation is formed by the high-temperature-side and low-temperature-side second threshold values $\alpha 2H$ and $\alpha 2L$, and the threshold value for the non-decelerating fuel-cut operation is formed by the high-temperature-side and low-temperature-side first threshold values $\alpha 1H$ and $\alpha 1L$, whereby the hysteresis is set for each threshold value, so that it is possible to positively avoid the control hunting of the electric pump 43 in a case where the intake air temperature TAE is in the vicinity of the threshold value.

Note that the present invention is by no means limited to the above-described embodiment, but can be practiced in various forms. For example, although in the embodiment, between the decelerating fuel-cut operation and the non-decelerating fuel-cut operation, both of threshold value-switching for the intake air temperature TAE (between the second threshold value $\alpha 2H$ and the first threshold value $\alpha 1H$) and energization duty ratio Iduty-switching for the electric pump 43 (between the second duty ratio IHigh and the first duty ratio ILow) are performed, only one of these switching operations may be performed.

Further, although in the embodiment, the energization duty ratio Iduty for the decelerating fuel-cut operation and the energization duty ratio Iduty for the non-decelerating fuel-cut operation are set to the second duty ratio IHigh and the first duty ratio ILow, which are fixed values, respectively, the two duty ratios IHigh and ILow may be set to be variable. In this case, for example, the energization duty ratio Iduty for the decelerating fuel-cut operation may be set such that it becomes larger as the difference between the intake air temperature TAE and the high-temperature-side second threshold value $\alpha 2H$ is larger, and similarly, the energization duty ratio Iduty for the non-decelerating fuel-cut operation may be set such that it becomes larger as the difference between the intake air temperature TAE and the high-temperature-side first threshold value $\alpha 1H$ is larger.

Furthermore, although in the embodiment, to positively avoid the control hunting of the electric pump 43, the threshold value for the decelerating fuel-cut operation and the threshold value for the non-decelerating fuel-cut operation are each formed by the two high-temperature-side and low-temperature-side threshold values to set a hysteresis for each threshold value, the setting of the hysteresis may be omitted to form each threshold value by a single threshold value.

Further, although in the embodiment, the intake air cooling circuit 40 for cooling intake air by the intercooler 7 is independent of the engine cooling circuit 30 for cooling the engine 3, this is not limitative, but the intake air cooling circuit 40 may share coolant with the engine cooling circuit 30 or a cooling circuit for cooling e.g. an electrical component of a hybrid vehicle. Furthermore, although in the embodiment, the turbocharger 11, which drives the turbine 14 by energy of exhaust gases and supercharges intake air by the compressor 12, is used as the supercharger, the present invention can also be applied to another type of supercharger, such as a mechanical supercharger (supercharger) directly driven by the engine, insofar as the supercharger includes a water-cooled intercooler. It is to be further understood that various changes and modifications may be made without departing from the spirit and scope of the invention.

REFERENCE SIGNS LIST

2 ECU (pump control means)
3 internal combustion engine
7 intercooler
10 generator
11 turbocharger (supercharger)
40 intake air cooling circuit (cooling circuit)
43 electric pump (electric water pump)
51 intake air temperature sensor (intake air temperature detection means)
TAE intake air temperature (intake air temperature at outlet of intercooler)
$\alpha 1H$ high-temperature-side first threshold value (first threshold value)
$\alpha 2H$ high-temperature-side second threshold value (second threshold value)
ILow first duty ratio (first electrical power)
IHigh second duty ratio (second electrical power)

The invention claimed is:

1. A cooling control system for an internal combustion engine that includes a supercharger for supercharging intake air, and is configured such that electrical power is generated by a generator using the engine as a motive power source, during a decelerating fuel-cut operation in which fuel supply to the engine is stopped, the cooling control system comprising:
    a water-cooled intercooler that cools the intake air supercharged by the supercharger, by using coolant circulating through a cooling circuit;
    an electric water pump for circulating the coolant through the cooling circuit; and
    pump control means for determining whether the engine is in a state of the decelerating fuel-cut operation, and when it is determined that the engine is in the state of the decelerating fuel-cut operation, driving the water pump during the decelerating fuel-cut operation by the generated electrical power.

2. The cooling control system according to claim 1, further comprising intake air temperature detection means for detecting an intake air temperature at an outlet of the intercooler,
    wherein during non-decelerating fuel-cut operation which is an operating state other than the decelerating fuel-cut operation, the pump control means drives the water pump when the detected intake air temperature is equal to or higher than a predetermined first threshold value, whereas during the decelerating fuel-cut operation, the pump control means drives the water pump when the intake air temperature is equal to or higher than a predetermined second threshold value smaller than the first threshold value.

3. The cooling control system according to claim 1, wherein during non-decelerating fuel-cut operation which is an operating state other than the decelerating fuel-cut operation, the pump control means drives the water pump by predetermined first electrical power, whereas during the decelerating fuel-cut operation, the pump control means drives the water pump by predetermined second electrical power larger than the first electrical power.

4. The cooling control system according to claim 2, wherein during non-decelerating fuel-cut operation which is an operating state other than the decelerating fuel-cut operation, the pump control means drives the water pump by predetermined first electrical power, whereas during the decelerating fuel-cut operation, the pump control means drives the water pump by predetermined second electrical power larger than the first electrical power.

5. A control method of a cooling control system for an internal combustion engine that includes a supercharger for supercharging intake air, and is configured such that electrical power is generated by a generator using the engine as a motive power source, during a decelerating fuel-cut operation in which fuel supply to the engine is stopped, the cooling control system comprising:
- a water-cooled intercooler that cools the intake air supercharged by the supercharger, by using coolant circulating through a cooling circuit; and
- an electric water pump for circulating the coolant through the cooling circuit, wherein the method comprises steps of:

determining by a computer whether the engine is in a state of the decelerating fuel-cut operation; and when it is determined that the engine is in the state of the decelerating fuel-cut operation, driving by a computer the water pump during the decelerating fuel-cut operation by the generated electrical power.

\* \* \* \* \*